(12) United States Patent
Sambeth

(10) Patent No.: US 9,776,068 B2
(45) Date of Patent: Oct. 3, 2017

(54) VEHICLE FOR THE MOVEMENT OF A DRIVER COMPRISING A BALL ROLLING ON A GROUND SURFACE AND IN ANY DESIRED DIRECTION

(71) Applicant: Innovated Transport Systems UG (haftungsbeschränkt), Essen (DE)

(72) Inventor: Ulrich Sambeth, Essen (DE)

(73) Assignee: Innovated Transport Systems UG (haftungsbeschränkt), Essen (DE)

( * ) Notice: Subject to any disclaimer, the term of this patent is extended or adjusted under 35 U.S.C. 154(b) by 0 days.

(21) Appl. No.: 15/035,992

(22) PCT Filed: Dec. 5, 2014

(86) PCT No.: PCT/EP2014/076770
§ 371 (c)(1),
(2) Date: May 11, 2016

(87) PCT Pub. No.: WO2015/082705
PCT Pub. Date: Jun. 11, 2015

(65) Prior Publication Data
US 2016/0296829 A1    Oct. 13, 2016

(30) Foreign Application Priority Data

Dec. 6, 2013   (DE) .......................... 10 2013 113 643
Jun. 3, 2014   (DE) .......................... 10 2014 107 763

(51) Int. Cl.
*A63C 17/24*   (2006.01)
*A63C 17/01*   (2006.01)
(Continued)

(52) U.S. Cl.
CPC ............ *A63C 17/24* (2013.01); *A63C 17/016* (2013.01); *A63C 17/12* (2013.01); *B62K 1/00* (2013.01)

(58) Field of Classification Search
CPC ....... A63C 17/24; A63C 17/016; A63C 17/12; B62K 1/00
See application file for complete search history.

(56) References Cited

U.S. PATENT DOCUMENTS

| 3,604,726 A |   | 9/1971 | Tracy |
| 4,106,786 A | * | 8/1978 | Talbott .................. A63C 17/01 |
|             |   |        | 280/205 |

(Continued)

FOREIGN PATENT DOCUMENTS

| CH | 611034 A | 8/1971 |
| CN | 101565073 A | 10/2009 |

(Continued)

OTHER PUBLICATIONS

Preliminary Report on Patentability of the International Searching Authority in English from corresponding Patent Cooperation Treaty (PCT) Application No. PCT/EP2014/076770, dated Mar. 29, 2016.

(Continued)

*Primary Examiner* — Drew J Brown
(74) *Attorney, Agent, or Firm* — Gardner, Linn, Burkhart & Flory, LLP

(57) ABSTRACT

A vehicle for the movement of a driver includes a rolling element, a carrier element supported by the rolling element, a drive arrangement supported by the carrier element and configured to drive the rolling element, and a control unit, by way of which the drive arrangement is steered in a desired travel direction depending on the inclination of the carrier element and the inclination direction of the carrier element. The vehicle is configured such that during operation of the vehicle, the driver stands freely and balances on the carrier element. In a particular embodiment, the rolling element rolling is a ball and the vehicle can be moved in any desired travel direction via the drive arrangement, with the driver (Continued)

being in contact with the vehicle exclusively by way of the driver's feet, and as the case may be, further by way of the driver's lower legs.

20 Claims, 14 Drawing Sheets

(51) Int. Cl.
*A63C 17/12* (2006.01)
*B62K 1/00* (2006.01)

(56) References Cited

U.S. PATENT DOCUMENTS

| | | | | |
|---|---|---|---|---|
| 7,357,767 | B2* | 4/2008 | Tsai | A63B 21/0004 |
| | | | | 482/146 |
| 7,467,681 | B2 | 12/2008 | Hiramatsu | |
| 7,811,217 | B2* | 10/2010 | Odien | A63B 21/0058 |
| | | | | 482/147 |
| 8,418,705 | B2 | 4/2013 | Ota et al. | |
| 8,562,386 | B2* | 10/2013 | Carlson | A63H 17/26 |
| | | | | 446/431 |
| 9,211,470 | B2* | 12/2015 | Bigler | A63C 17/12 |
| 9,452,345 | B2* | 9/2016 | Doerksen | A63C 17/01 |
| D768,252 | S * | 10/2016 | Bigler | D21/760 |
| 9,597,580 | B2* | 3/2017 | Doerksen | A63C 17/12 |
| 9,598,141 | B1* | 3/2017 | Doerksen | B62M 7/12 |
| 2005/0134106 | A1 | 6/2005 | Guile | |
| 2006/0260862 | A1* | 11/2006 | Nishikawa | B62K 17/00 |
| | | | | 180/315 |
| 2008/0242515 | A1 | 10/2008 | Odien | |
| 2010/0243342 | A1* | 9/2010 | Wu | B60B 19/14 |
| | | | | 180/7.1 |
| 2016/0375337 | A1* | 12/2016 | Kastner | H04W 4/025 |
| | | | | 473/441 |

FOREIGN PATENT DOCUMENTS

| | | | |
|---|---|---|---|
| CN | 102300765 | A | 12/2011 |
| DE | 2657187 | B2 | 5/1978 |
| EP | 1181187 | B1 | 3/2006 |
| GB | 2407780 | A | 5/2005 |
| JP | 2001163277 | A | 6/2001 |
| JP | 2004129435 | A | 4/2004 |
| NL | 1033676 | C2 | 10/2008 |
| WO | 9831583 | A1 | 7/1998 |

OTHER PUBLICATIONS

International Search Report and Written Opinion of the International Searching Authority from corresponding Patent Cooperation Treaty (PCT) Application No. PCT/EP2014/076770, dated Apr. 2, 2015.

* cited by examiner

VEHICLE FOR THE MOVEMENT OF A DRIVER COMPRISING A BALL ROLLING ON A GROUND SURFACE AND IN ANY DESIRED DIRECTION

The present application claims the priority benefits of International Patent Application No. PCT/EP2014/076770, filed on Dec. 5, 2014, and claims benefit of DE 102014107763.6, filed on Jun. 3, 2014, and DE 102013113643.5, filed on Dec. 6, 2013.

BACKGROUND OF THE INVENTION

The invention relates to a vehicle for the movement of a driver, comprising an element rolling on a ground surface, a carrier element unstably supported on the rolling element, a drive arrangement which is supported by the carrier element and drives the rolling element, and a control unit, by way of which the drive arrangement is steered in a desired travel direction in dependence upon the inclination of the carrier element and the inclination direction of the carrier element, wherein the vehicle having the carrier element is configured such that during the operation of the vehicle, the driver stands freely and balancing on the carrier element.

European patent document EP 1 181 187 B1 already discloses a person transporter which can be used as a mobile working platform, recreation vehicle, golf car or delivery vehicle. This transporter consists substantially of a platform, on which the driver stands, and a control lever-like grip which is arranged centrally on the platform. Operating elements for the transporter can be arranged on the grip. The platform can be moved on a ground surface by means of one or a plurality of wheels and is unstably mounted in relation to the wheel(s). In this case, the wheels are arranged between, underneath or next to the driver's legs. The wheels are driven by means of electric motors which, in cooperation with a control unit, on the one hand balance the platform in relation to the wheels and on the other hand convert a tilting movement of the platform by the driver into commands for driving the wheels in the corresponding tilting direction. An extent of the tilting movement can also be evaluated as a measurement of an acceleration. In one embodiment, instead of using one or a plurality of wheels a ball is used which then permits travel movements in the x- and y-direction. In further embodiments comprising a single wheel as shown therein in FIGS. 11 to 13, a control lever-like grip is dispensed with and the driver stands freely balancing on a skateboard-like platform. In this case, the driver's feet are located, as seen in the rolling direction of the wheel, on the right and left next to the wheel or in front of and behind the wheel. When the driver's feet are placed in front of and behind the wheel, in one embodiment the forward sections of the foot point in the rolling direction and in the other embodiment they point transversely to the rolling direction.

Furthermore, Dutch laid-open document NL 103 36 76 discloses a ball roller for movement of a standing driver. This ball roller also consists substantially of a ball functioning as a wheel, a platform for the driver and a control lever-like grip. The ball is driven by means of six omniwheels.

Furthermore, Swiss laid-open document CH 511 034 A discloses a training or recreational apparatus comprising an elastic ball, to which a circumferential ring serving as a standing surface for the user is attached. In addition, the region of the ball is provided with two opposite straps, under which the user can slide his feet. This training or recreational apparatus is provided to enable the user to move therewith in a hopping fashion. In the British laid-open document GB 2 4007 780 A, a surfboard or balance board is disclosed which comprises in the centre a ball which rolls on the ground surface. In order to support the driver when using the board, further rollers are arranged on the front and rear end. When stationary, the same board can also be used as a so-called balance board. Then, the underside of the board is provided with a half-ball which engages in a carrier ring arranged on a ground surface. The board is not driven. United States laid-open document U.S. Pat. No. 3,604,726 A also discloses a training or recreational apparatus which is comparable to the above-described board, wherein the standing surface is designed therein as a circular disk. Japanese and international laid-open documents JP 2001-163 277 A and WO 98/31 583 A1 concern the driving of balls. U.S. Pat. No. 8,418,705 B2 relates to a walking stick, to the lower end of which a wheel is attached which is driven in connection with the inclination of the walking stick. U.S. Pat. No. 7,467,681 B2 illustrates a further board which is driven. However, in this case a centrally arranged roller is used for driving purposes. German patent DE 26 57 187 B2 describes a gyroscope system comprising a gyrating mass which can be used e.g. in order to compensate for pivot movements of motor vehicles when cornering and to serve as a counterweight in cranes. US laid-open document US 2005/0 134 106 A1 relates to an omni-wheel.

SUMMARY OF THE INVENTION

Proceeding from this, the object of the present invention is to provide a particularly simple vehicle for the movement of a driver comprising an element rolling on a ground surface.

In accordance with an embodiment of the invention, a particularly simple vehicle for the movement of a driver, comprising an element rolling on a ground surface, comprising a carrier element unstably supported on the rolling element, a drive arrangement which is supported by the carrier element and drives the rolling element, and a control unit, by way of which the drive arrangement is steered in a desired travel direction in dependence upon the inclination of the carrier element and the inclination direction of the carrier element, is provided by virtue of the fact that the element rolling on the ground surface is a ball, and by means of the drive arrangement the vehicle can be moved in any desired directions and the driver is in contact with the vehicle exclusively by way of his feet and, as the case may be, additionally by way of his lower legs. In connection with the invention, the terms foot and lower leg are understood to be the region below the knee to the sole of the foot or forward section of the foot including the ankle joint. In addition to contact with the foot there may be additional contact with one or both calves. The vehicle is characterised in particular by a simple construction. Moreover, it can be steered simply by means of a shift of weight on the part of the balancing driver who thereby changes the degree of inclination of the carrier element and the inclination direction proceeding from a balanced, preferably horizontal orientation of the carrier element. For as long as the driver brings about an inclination as a result of the shift of weight, the vehicle moves in this direction. The driver thus steers the vehicle by shifting his weight. Moreover, the use of the ball has the advantage that the vehicle can be moved on the ground surface in all desired directions in combination with a balancing of the entire system (human-vehicle). This vehicle is particularly suitable as a sports apparatus, recreational apparatus or an apparatus on which to have fun. In this regard, the phrase 'can be moved in any desired travel directions' is to be understood to mean that the travel direction of the vehicle is decoupled from the driver's viewing direction, i.e. in the case of a specified viewing direction the driver can move in all travel directions relative thereto. Moreover, the vehicle in accordance with the invention is operated in the manner of a skateboard because the driver stands freely balancing on the carrier element. The driver does not have at his disposal any auxiliary means such as a handlebar, a support or a seat for support purposes or as a balancing aid. Preferably, the driver simply stands on the carrier element in the region of the standing surfaces. In order to transmit inclination forces more easily from the driver to the carrier element and to improve the driver's standing position on the carrier element, the driver's foot can be guided laterally with straps, protrusions, recesses or similar means. These guiding elements can also be extended upwardly into the region of the lower leg, preferably the calf. The driver can steer the vehicle sensitively by virtue of the additional contact with the side and/or rear side of the calf. All of these assisting means are preferably open in one direction, so that the driver can easily move out of them when required.

In a particularly advantageous manner, provision is made that the vehicle does not have a holding grip for the driver. Therefore, the driver can balance freely on the carrier element of the vehicle without being supported using his hand on a support or on a handlebar or sitting on a saddle or seat arranged on the carrier element. In this regard, a holding grip is to be understood to mean that a driver balancing on the carrier element could be supported thereon with one or both hands during travel. Therefore, a carrier grip on the carrier element for transporting the vehicle would not be a holding grip because it cannot be reached by a standing driver.

In an advantageous manner, an opening is arranged in the carrier element and the carrier element is designed as an annular disk. The annular configuration of the carrier element makes it easier to get on and get off the vehicle because when the disk is oriented horizontally and the ground surface is horizontal, the distance from the ground surface is the same in every tilting direction.

An unstable suspension or support of the carrier element on the ball is achieved in a particularly convenient manner by virtue of the fact that the ball protrudes into the opening in the carrier element.

An average level of balance ability of the vehicle in relation to difficulty is achieved by virtue of the fact that the annular disk of the carrier element is arranged at the height of a horizontal equator of the ball.

In an alternative embodiment, the carrier element is in the shape of a trapezoidal sheet as seen in the forwards travel direction of the vehicle. The annular shape of the carrier element is thus reduced to the standing surfaces for the feet and thus becomes more compact and more easily transportable. By means of the reduction to the standing surfaces, said standing surfaces are to be connected by means of a web which extends above the ball.

Moreover, provision is made that standing surfaces for the driver are arranged on the carrier element and the standing surfaces are arranged oppositely in relation to the ball. As a result, a good level of balance ability of the vehicle is achieved because the ball is located between the freely standing driver's legs.

In structural terms, it is particularly advantageous that the drive arrangement is attached to the carrier element and the drive arrangement comprises at least two omni-wheels having an axis of rotation for transmitting the driving forces to the ball. In this case, the axis of rotation is oriented in parallel with the carrier element.

The driving forces can be introduced particularly well into the ball if three omni-wheels are arranged on the carrier element and are distributed uniformly around the ball.

The carrier element can be stabilised with respect to the ball and the carrier element can be rotated with respect to the ball by virtue of the fact that the drive arrangement comprises at least one omni-wheel having an axis of rotation, the axis of rotation thereof being in parallel with the vertical axis of the ball when the carrier element is oriented horizontally, and the at least one omni-wheel acts upon the ball at the height of a horizontal equator.

In a preferred embodiment, provision is made that the drive arrangement comprises a fourth omni-wheel and a fifth omni-wheel in each case having an axis of rotation in parallel with the vertical axis of the ball when the carrier element is oriented horizontally, said omni-wheels being arranged on the carrier element oppositely in relation to the ball.

In an alternative embodiment, provision is made that at least one of the axes of rotation is inclined proceeding from a vertical position in the direction of the ball. As a result, it is advantageously possible to dispense with the omni-wheels for moving the carrier element about the z-axis.

In a particularly advantageous manner, provision is made that when the vehicle is moved in a forwards travel direction the fourth omni-wheel and the fifth omni-wheel act upon the ball in the region of a roll axis.

In order to determine the position of the carrier element in space, the carrier element has gyroscopes arranged thereon, by means of which the degree of inclination and inclination direction of the carrier element can be measured and the measured inclination and inclination direction are transmitted to the control unit.

In an advantageous manner, provision is made that the control unit comprises a balance-control module which assists a driver when balancing the carrier element in a horizontal position in space. This balancing of the carrier element in a balanced orientation is effected by corresponding actuation of the first, second and third omni-wheel. The degree of assistance can be varied and can be adjusted to such a level that it is relative simple for the driver to balance on the carrier element. On the other hand, the assistance is not so great that the driver is prevented from shifting his weight in the manner of an accelerator pedal to produce an acceleration of the vehicle in the inclination direction by the shift of weight.

The invention will be described in greater detail hereinafter with reference to an exemplified embodiment illustrated in the drawings.

DESCRIPTION OF THE PREFERRED EMBODIMENTS

Figure 1:
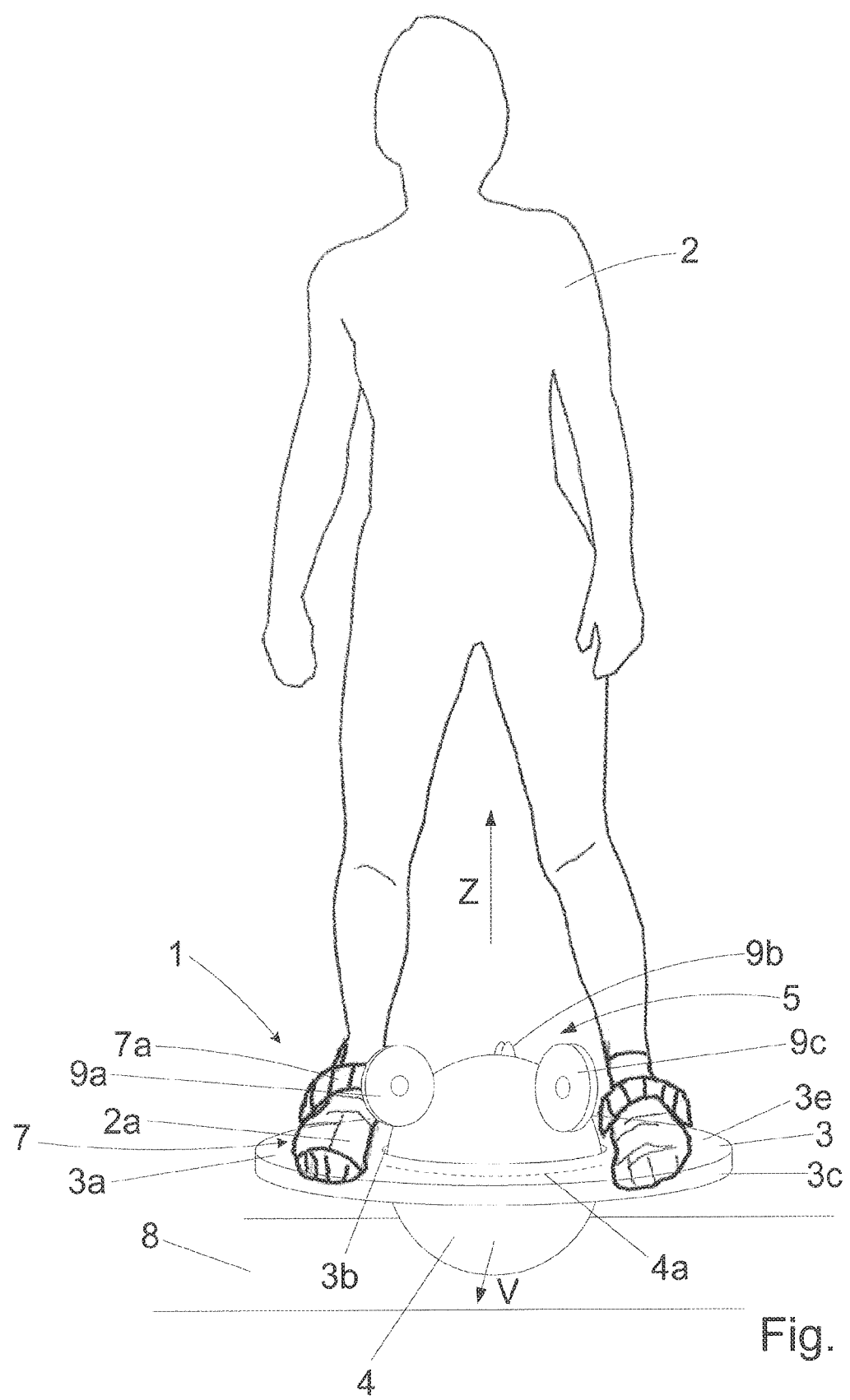
FIG. 1 shows a schematic perspective view of a first embodiment of a vehicle for the movement of a driver in accordance with the invention.
Figure 2:
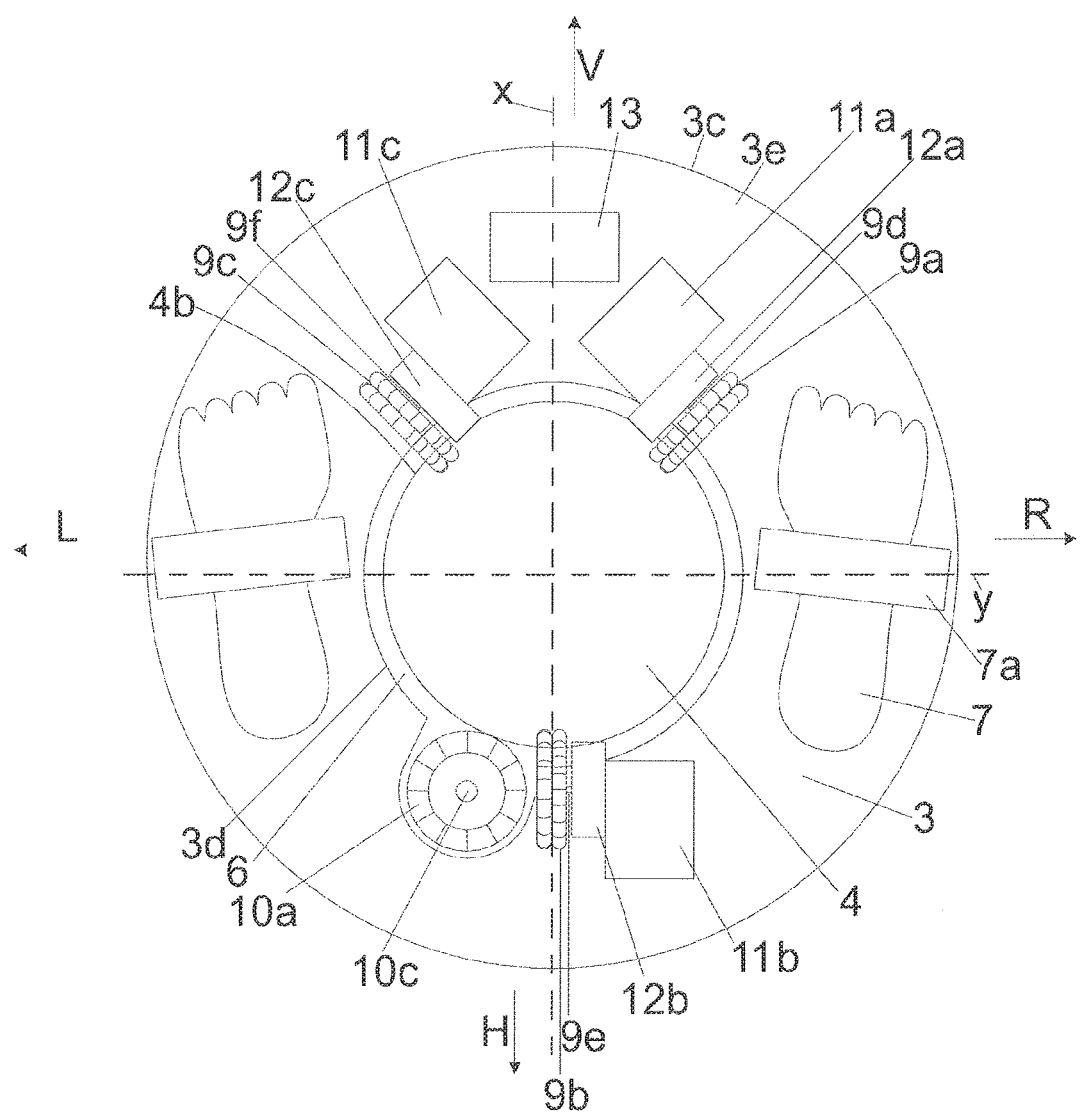
FIG. 2 shows a plan view of the vehicle in accordance with FIG. 1 without a driver.

FIG. 1 illustrates a schematic perspective view of a first embodiment of a vehicle 1 for the movement of a driver 2 in accordance with the invention. The vehicle 1 consists substantially of a carrier element 3, an element in the form of a ball 4 rolling on a ground surface 8, and a drive arrangement 5. Three omni-wheels 9a, 9b and 9c of the drive arrangement 5 are illustrated only schematically. A fourth omni-wheel 10 is concealed by the ball 4 and is shown in FIG. 2. The carrier element 3 is designed as an annular disk 3a having a central circular opening 3b and an outer circular edge 3c. Moreover, the carrier element 3 is designed as a plate or metal sheet, so that the height of a horizontally oriented carrier element 3 is equal to a fraction of the height of the ball 4. Fundamentally, it is also feasible for the carrier element 3 to have not only a circular edge 3c but also an oval, rectangular or polygonal edge 3c or combinations thereof. The same applies to the opening 3b. Overall, however, the circular shape of the carrier element 3 has the advantage that at the end of a journey the driver 2 can tilt and park the carrier element 3 in any desired position on the edge 3c of the carrier element 3. The same applies in reverse for getting onto the carrier element 3 and subsequently driving off. The ball 4 is inserted from below into the opening 3b or the carrier element 3 is placed with its opening 3b onto the ball 4. In this case, the carrier element 3 is then supported on the ball 4 by means of the drive arrangement 5. The drive arrangement 5 is configured in such a manner that a gap 6 (see FIG. 2) remains between an inner edge 3d (see FIG. 2) of the opening 3b in the disk 3a, which defines the opening 3b externally, and the ball 4. The gap 6 ensures free spatial mobility of the ball 4 relative to the carrier element 3. By means of the drive arrangement 5, the ball 4 can be moved relative to the carrier element 3 and thus rolls on the ground surface 8. The drive arrangement 5, in particular the movement direction of the ball 4, is activated in a desired travel direction by means of a shift of weight on the part of the driver 2 and thus an inclination of the carrier element 3. Correspondingly, a driver 2 can thus move in all desired directions on the ground surface 8 with the aid of the vehicle 1.

FIG. 1 also shows that the driver 2 stands on the carrier element 3 without a control lever-like grip—as is known for instance in the case of a skateboard—when he is moving with the vehicle 1. A kneeboard or a seat are also not provided on the carrier element 3. However, a grip can be provided on the carrier element 3 or a grip opening can be provided in the carrier element 3 in order to be able carry the vehicle 1 in a convenient manner. For the driver 2, the vehicle 1 provides on the carrier element 3 two standing surfaces 7 for the feet 2a of the driver 2. These standing surfaces 7 can be mere markings the size of feet 2a, corresponding free regions on the carrier element 3, can comprise a holding strap 7a or can be formed in the shape of shoes or sandals with or without a holding strap 7a or means acting in a similar manner in order to provide the driver 2 with a more secure footing on the carrier element 3 during travel. It has proven to be particularly advantageous to provide, in the region of the standing surfaces 7, guides in the manner of a snowboard binding without a holding strap which are open at the top and in the forwards travel direction V. Therefore, the driver 2 can get off the vehicle at any time by taking a large step forwards and during travel can guide the vehicle 1 using his calves which lie against the guide. The calf and feet are additionally guided laterally by this open guide shell and the calf is also guided at the rear. The guides are formed in an elastic manner in order to allow the driver 2 to step forwards off the vehicle, but can narrow the access opening in the initial state, so that when getting on the vehicle, the guides must be moved outwards in the elastic region to enlarge the access opening. In any event, the guide remains open at the top and in the forwards travel direction V. The type of guide offers a good compromise between standing freely on the vehicle and at the same time transmitting guide forces to the carrier element 3.

The standing surfaces 7 also indirectly determine the size or width of the carrier element 3 because the driver must stand comfortably and safely on the carrier element 3 in order to be able to steer the vehicle by shifts of weight. In relation to the standing surfaces 7, it is also shown that said standing surfaces are arranged on the carrier element 3 oppositely in relation to the ball 4. As seen in a forwards travel direction V of the vehicle 1, the standing surfaces 7 are arranged on the right and left next to the ball 4. In this case, the forwards travel direction V is related to the driver 2 such that the driver moves forwards with a straight viewing direction, i.e. with his chest forwards.

Moreover, it can be seen in FIG. 1 that the carrier element 3 is arranged in its horizontally oriented position preferably at the height of an equator 4a in relation to a vertical axis z of the ball 4. It is also feasible to arrange the carrier element 3 at a higher position for advanced drivers or at a lower position for beginners. As a result, larger or smaller inclination angles of the carrier element 3 in relation to the ball 4 are permitted which make balancing, getting on and off or steering the vehicle 1 more difficult or easier. Irrespective of the position of the carrier element 3 relative to the equator 4a of the ball 4, the omni-wheels 9a, 9b and 9c are supported above the equator 4a of the ball 4 when the carrier element 3 is oriented horizontally, since the carrier element 3 is unstably suspended or supported on the ball 4 only by means of the omni-wheels 9a, 9b and 9c.

FIG. 2 shows a plan view of the vehicle 1 without a driver 2. This view shows particularly clearly the configuration of the drive arrangement 5. The drive arrangement 5 consists substantially of a first omni-wheel 9a, a second omni-wheel 9b and a third omni-wheel 9c which are each mounted so as to be able to rotate about a first axis of rotation 9a, a second axis of rotation 9b and a third axis of rotation 9c, and of a fourth omni-wheel 10 which is mounted so as to be able to rotate about a fourth axis of rotation 10a. The omni-wheels 9a, 9b, 9c and 10 which are used are generally known and are also defined as omnidirectional wheels. In the case of the omni-wheels 9a, 9b, 9c and 10, the running surface of the omni-wheel 9a, 9b, 9c and 10 consists of a multiplicity of rollers which are arranged along the circumference and of which the axis of rotation are at a right angle to the axis of rotation 9d, 9e, 9f and 10a of the respective omni-wheel 9a, 9b, 9c and 10 and tangentially with respect to the circumference of the omni-wheel 9a, 9b, 9c and 10. The use of omni-wheels 9a, 9b, 9c and 10 renders it possible for the ball 4 to be able to rotate with low friction not only in the drive direction of the respective omni-wheel 9a, 9b, 9c and 10 but also in all other directions.

In order to be explain the travel directions and the mode of operation of the vehicle 1 in greater detail hereinafter, a Cartesian coordinate system is set with its zero point in the centre point of the ball 4. The longitudinal axis x of this coordinate system thus points in the forwards travel direction V and rearwards travel direction H; the transverse axis y points in the right travel direction R and left travel direction L and the vertical axis z points to the vertical. In this case, the longitudinal axis x and the transverse axis y extend in parallel and the vertical axis z extends at a right angle with respect to a horizontally oriented ground surface 8.

By means of the omni-wheels 9a, 9b and 9c, the vehicle 1 can be moved in all directions V, H, R and L and intermediate directions thereof. In this case, the axes of rotation 9d, 9e, 9f are arranged in parallel with an upper side 3e of the carrier element 3 and at a spaced interval and tangentially with respect to the surface 4b of the ball 4. Accordingly, in the case of a horizontal ground surface 9 and an upper side 3e of the carrier element 3 in parallel therewith, the axes of rotation 9d, 9e, 9f are oriented in parallel with the ground surface 9. Moreover, the first, second and third omni-wheel 9a, 9b and 9c are arranged distributed uniformly around the circumference of the ball 4. As seen in relation to the zero point of the coordinate system and the x-y plane, the omni-wheels 9a, 9b and 9c are each spaced apart from one another at an angle of 120 degrees. The second omni-wheel 9b is oriented with its axis of rotation 9e at a right angle with respect to the longitudinal axis x and is aligned with the longitudinal axis x. A movement of the vehicle 1 in the forwards travel direction V or rearwards travel direction H is achieved e.g. by virtue of the fact that the second omni-wheel 9b is driven in one direction and the two other omni-wheels 9a, 9c are driven in the opposite direction. Corresponding to the uniform distribution of the omni-wheels 9a, 9b and 9c, the first and third omni-wheels 9a, 9c are arranged between the longitudinal axis x and the transverse axis y and in relation to the transverse axis y opposite the second omni-wheel 9b. The axes of rotation 9d, 9f of the first and third omni-wheels 9a, 9c are thus oriented obliquely with respect to the longitudinal axis x and also with respect to the transverse axis y. The omni-wheels 9a, 9b, 9c have to serve the function not only of drive wheels but also always at the same time the function of support wheels for the respectively opposite omni-wheels 9c, 9b, 9a. A coordinated operation of the omni-wheels 9a, 9b, 9c thus results in a movement of the vehicle 1 in the forwards travel direction V and right travel direction R or in the rearwards travel direction H and left travel direction L or in every desired intermediate direction thereof.

By means of the fourth omni-wheel 10, the vehicle 1 can be stabilised in relation to a rotation of the carrier element 3 about the ball 4 or the vertical axis z. This can be required e.g. for movements of the vehicle 1 in the forwards travel direction V or in the rearwards travel direction H. The fourth omni-wheel 10 can also be used in order to rotate the carrier element 3 relative to the ball 4 with the aim of ensuring that the driver 2 remains with his chest oriented in the respective travel direction. The fourth omni-wheel 10 is mounted on the carrier element 3 so as to be rotatable about its axis of rotation 10a and is in engagement with the surface 4b of the ball 4 at the height of the equator 4a of the ball 4. In this case, the axis of rotation 10a is oriented in parallel with the vertical axis z if the carrier element 3 is oriented horizontally. Since the carrier element 3 in the exemplified embodiment is arranged at the height of the equator 4a of the ball 4, the fourth omni-wheel 10 is recessed into the carrier element 3. Should the carrier element 3 be arranged higher or lower in relation to the equator 4a, the position of the fourth omni-wheel 10 is to be adapted accordingly, so that it continues to be in engagement with the ball 4 in the region of the equator 4a.

It can also be seen in FIG. 2 that the three omni-wheels 9a, 9b and 9c are each driven by an electric motor 11a, 11b and 11c having a transmission 12a, 12b and 12c connected upstream. The motors 11a, 11b and 11c are attached to the carrier element 3 and are actuated by a control unit 13. A corresponding drive is also provided for the fourth omni-wheel 10 but is not illustrated in FIG. 2. 24V direct current motors are used as the motors 11a, 11b and 11c and have outputs in the range of 350 Watt to 800 Watt.

As an alternative to the three omni-wheels 9a, 9b and 9c, four omni-wheels can also be used, of which at least two are driven. The remaining and opposite omni-wheels then assume the function of support wheels. In an advantageous manner, the four omni-wheels are distributed uniformly around the ball 4 and the adjacent omni-wheels are each arranged at 90 degrees with respect to one another. Drive variants in which the fourth omni-wheel 10 is omitted in relation to the z-axis are also feasible.

It can also be seen in FIG. 2 that a circumferential gap 6 remains between the surface 4b of the ball 4 and the inner edge 3d of the carrier element 3 and allows the ball 4 to be able to rotate freely relative to the carrier element 3. Suspension for the vehicle 1 can also be provided in the region of the articulation of the omni-wheels 9a, 9b, 9c, 10 or by means of an elastic ball. The carrier element 3 is supported on the ball exclusively by the omni-wheels 9a, 9b, 9c, 10. Further supporting or connecting elements are not required. The ball 4 is produced from duroplastic synthetic material. For example, bowling balls are suitable.

Figure 3:
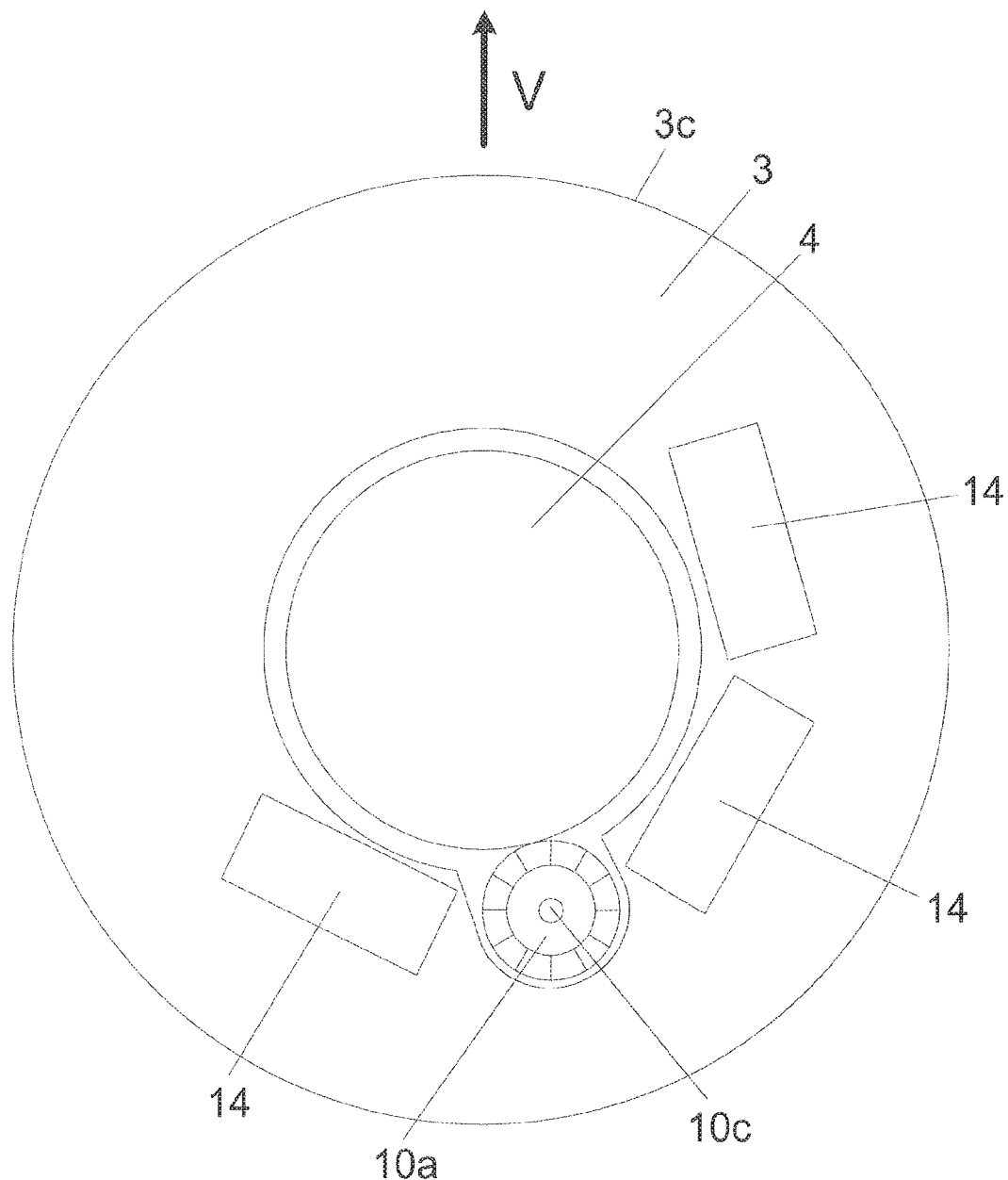
FIG. 3 shows a view of the vehicle in accordance with FIG. 2 from below.

FIG. 3 shows a view of the vehicle 1 in accordance with FIG. 2 from below. It can be seen that a plurality of rechargeable batteries 14 are attached to the carrier element 3 from below. The batteries 14 are arranged as closely as possible to the ball 4 in order not to hinder a tilting movement of the carrier element 3 and to facilitate balancing of the carrier element 3. In relation to the facilitated balancing, a plurality of batteries 14 are also provided distributed along the carrier element 3 and the ball 4. Essentially, it is also possible to also arrange the batteries 14 on the carrier element 3 or to use only one battery 14.

Figure 4:
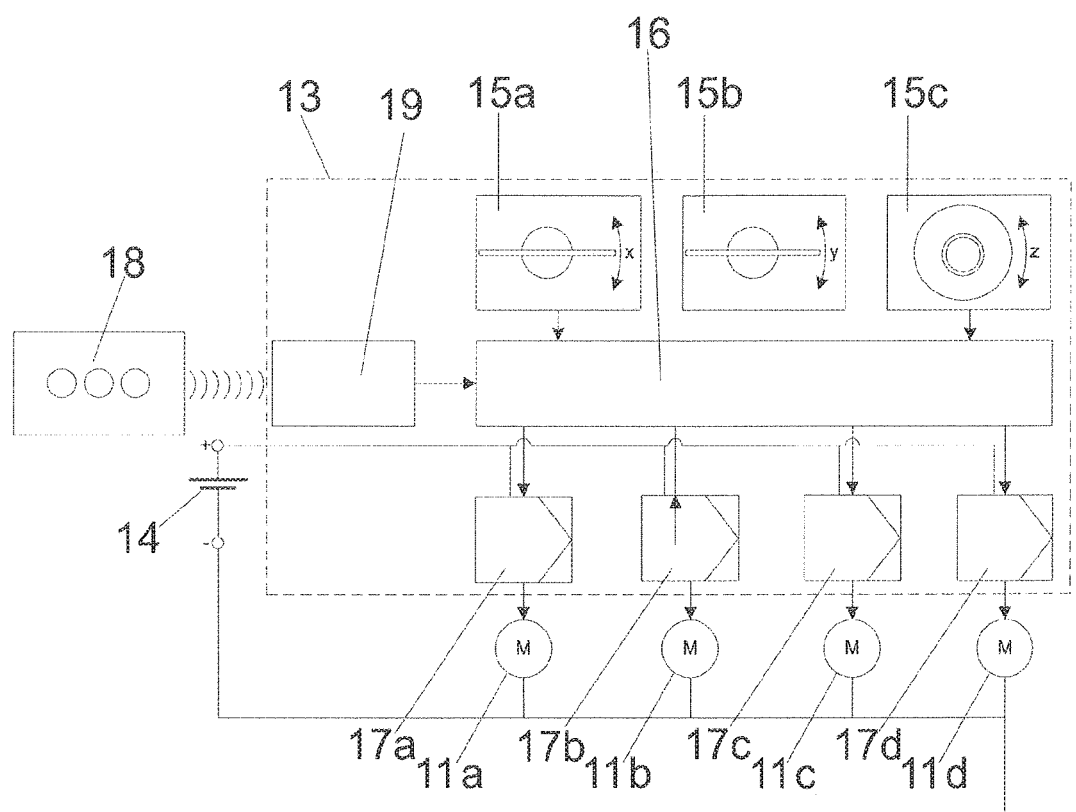
FIG. 4 shows a simplified circuit diagram of the control unit of the vehicle.

FIG. 4 illustrates a basic circuit diagram of the control unit 13 of the vehicle 1. The control unit 13 is arranged on the carrier element 3. Combined in the control unit 13 are a multiplicity of components in order to detect, starting from a balance position of the carrier element 3, shifts of weight on the part of the driver 2 and thus an inclination of the carrier element 3. The degree of inclination and the inclination direction are detected by a pitch gyroscope 15a, a roll gyroscope 15b and a yaw gyroscope 15c. The gyroscopes 15a, 15b and 15c provide acceleration and angle data. The pitch gyroscope 15a detects the pivot movement about the transverse axis y, the roll gyroscope 15b detects the pivot movement about the longitudinal axis x and the yaw gyroscope 15c detects the pivot movement about the vertical axis z. In dependence upon the detected degree of the inclination and the inclination direction, in an evaluation control unit 16 the motor(s) 11a, 11b, 11c and 11d to be driven is/are actuated in the required rotational direction and at the required rotational speed specifically by means of a regulator in each case, in order to produce the desired travel movement. At the same time, by means of a balance-control module within the evaluation control unit 16 the balance position of the carrier element 3, which is preferably horizontal, is to be achieved in parallel by means of corresponding actuation of the motors 11a, 11b and 11c. The evaluation control unit 16 is designed as a programmable microcomputer. The travel movement produced previously by the driver 2 by means of the first shift of weight is retained as long as the driver 2 maintains the inclination of the carrier element 3, and is cancelled if the driver 2 shifts his weight in the opposite direction. The fourth omni-wheel 10 stabilises the carrier element 3 relative to the ball 4, which is helpful in the case of linear travel movements. Undesired control states, such as a rotation of the carrier element 3 about the ball 4, can also be resolved. In connection with steering control modules within the evaluation control unit 16, a rotation of the carrier element 3 relative to the ball 4 can be induced in a targeted manner, so that the driver 2 always remains oriented with his chest in the travel direction or is oriented with his chest in the travel direction at the end of a steering movement.

Moreover, it can be seen in the basic circuit diagram of FIG. 4 that a control element 18 is provided in the form of a manual remote control, by means of which the vehicle 1 can be switched on and off. The control element 18 is also provided with a dead-man switch, so that the vehicle 1 is only switched on if a corresponding button on the control element 18 is pressed by the driver 2. Further buttons can also be provided in order to be able to select different travel programs. These travel programs can be applied according to different considerations. Different levels of difficulty between beginners and experienced users and different weight classes can be set which include different accelerations, maximum speeds and levels of sensitivity of the gyroscopes or the actuation signals, determined therefrom, for the motors 11a, 11b, 11c and 11d. The fourth motor 12d, by which the movement of the carrier element 3 about the ball 4 is controlled, can also be actuated in different ways. An actuation of the fourth motor 12d via the measurement signals of the yaw gyroscope 15c results substantially in a stabilisation of the carrier element 3 and prevents undesired rotation of the carrier element 3 about the vertical axis z. In order, as is known from cycling, to be able to negotiate bends, it is possible to store in the evaluation control unit 16 that the actuation of the fourth motor 12d can be superimposed by means of the control element 18 and a joystick present therein, so that the carrier element 3 rotates about the ball 3 or the vertical axis z thereof, so that the driver 2 continues to travel with his chest forwards. Essentially, the travel movements in all travel directions V, H, R and L are also independent of one another and are possible without a rotation of the carrier element 3. A more natural travel feeling is imparted by a superimposition with the rotational movement via the vertical axis z by means of the control element 18. A slow travel program and a fast travel program can also be provided.

The aforementioned pitch gyroscope 15a, roll gyroscope 15b and yaw gyroscope 15c are to be understood to be any type of measuring devices which can be used to determine the angular positions and angular directions in relation to the longitudinal axis x, transverse axis y and vertical axis z. Typically, they are electronic circuits which operate with piezoelectric sensors. Since the pitch gyroscope 15a, the roll gyroscope 15b and the yaw gyroscope 15c are each arranged at right-angles with respect to one another, the position of the carrier element 3 in space can be determined hereby.

A second embodiment of the present invention will be described hereinafter with reference to FIGS. 5 to 8 and corresponds substantially to the first embodiment, so that reference is made to the foregoing description in relation to FIGS. 1 to 4. Only the differences will be described below.

Figure 5:
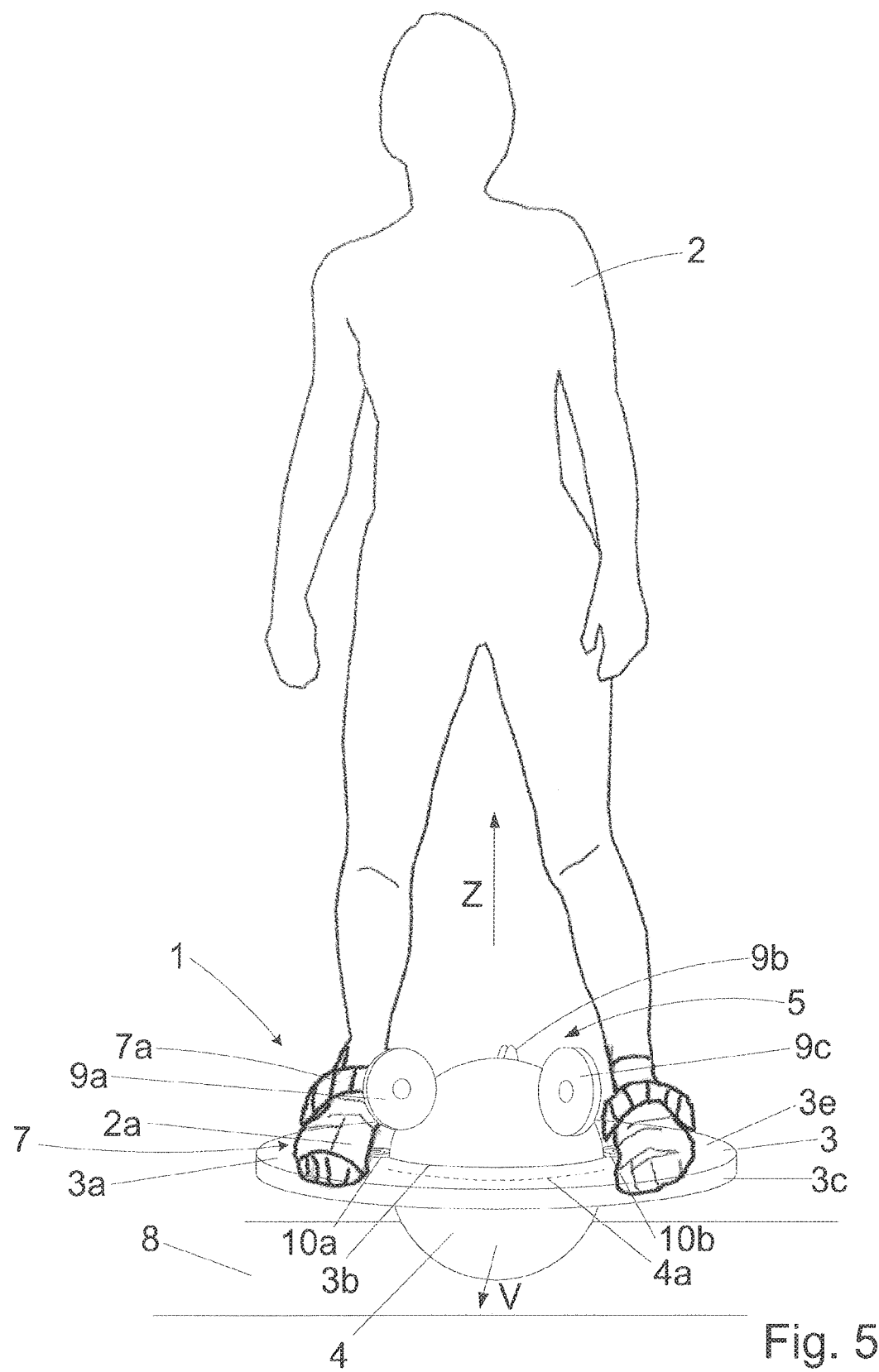
FIG. 5 shows a schematic perspective view of a second embodiment of a vehicle for the movement of a driver in accordance with the invention.

FIG. 5 shows a schematic perspective view of a second embodiment of a vehicle 1 in accordance with the invention. A fourth omni-wheel 10a and a fifth omni-wheel 10b can be seen in the region of the feet 2a of the driver 2 and between his feet 2a and the ball 4. The fourth omni-wheel 10a and the fifth omni-wheel 10b are arranged in a planar manner in the carrier element 3 and are each mounted so as to be rotatable about axes of rotation 10c, 10d, not illustrated. The fourth and fifth axes of rotation 10c, 10d are oriented vertically when the carrier element 3 is oriented horizontally. It is also evident that in relation to the ball 4, the fourth omni-wheel 10a and the fifth omni-wheel 10b are arranged 180 degrees offset with respect to one another and opposite one another. In relation to the forwards travel direction V, the fourth omni-wheel 10a and the fifth omni-wheel 10b are arranged in an axially symmetrical manner. Therefore, in the forwards travel direction V of the vehicle 1 the fourth omni-wheel 10a and the fifth omni-wheel 10b act upon the ball 4 in the region of a roll axis. The fourth omni-wheel 10a and the fifth omni-wheel 10b are also driven in precisely the same manner as the other three omni-wheels 9a, 9b and 9c by means of a fourth and fifth electric motor 11d and 11e which are shown schematically only in FIG. 8, since they are concealed by the carrier element 3 in FIG. 6. The fourth and fifth electric motors 11d and 11e are thus arranged on the underside of the carrier element 3 together with the upstream-connected transmissions. It is also possible to also arrange the fourth and fifth electric motor 11d and 11e together with the upstream-connected transmissions on the upper side of the carrier element 3, wherein, however, the underside is preferred.

Figure 6:
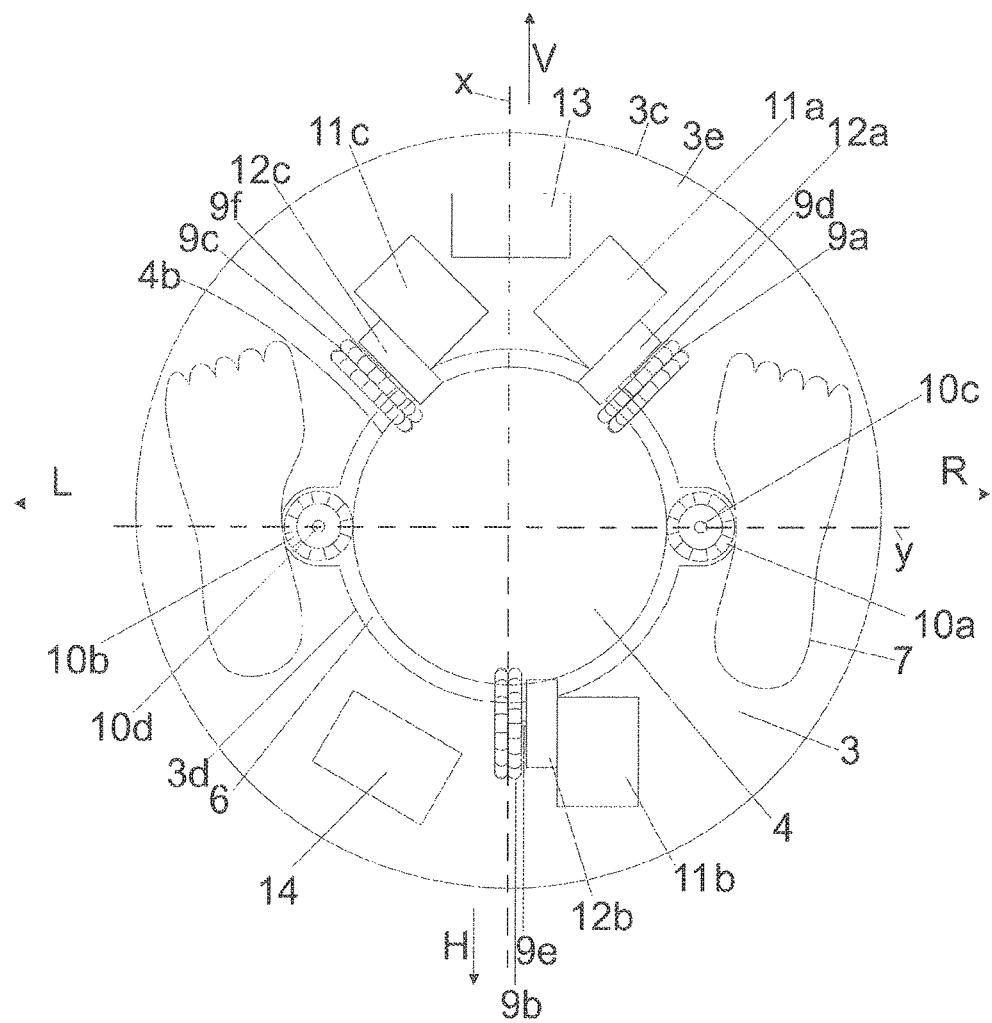
FIG. 6 shows a plan view of the vehicle in accordance with FIG. 5 without a driver.
Figure 7:
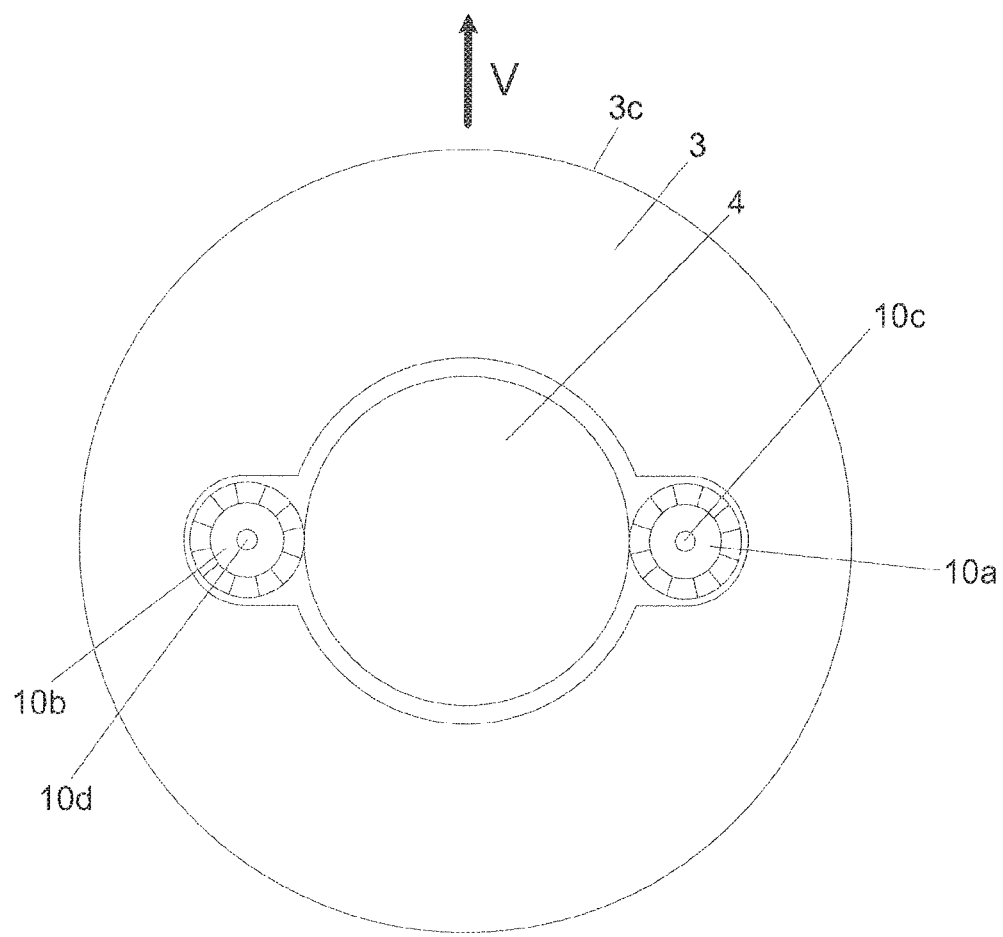
FIG. 7 shows a view of the vehicle in accordance with FIG. 6 from below.

In contrast to FIG. 3, batteries 14 cannot be seen in FIG. 7 because they are now arranged on the upper side of the carrier element (see FIG. 6). The position of the now single battery 14 is selected such that the carrier element 3 is balanced in relation to the other components arranged thereon.

Figure 8:
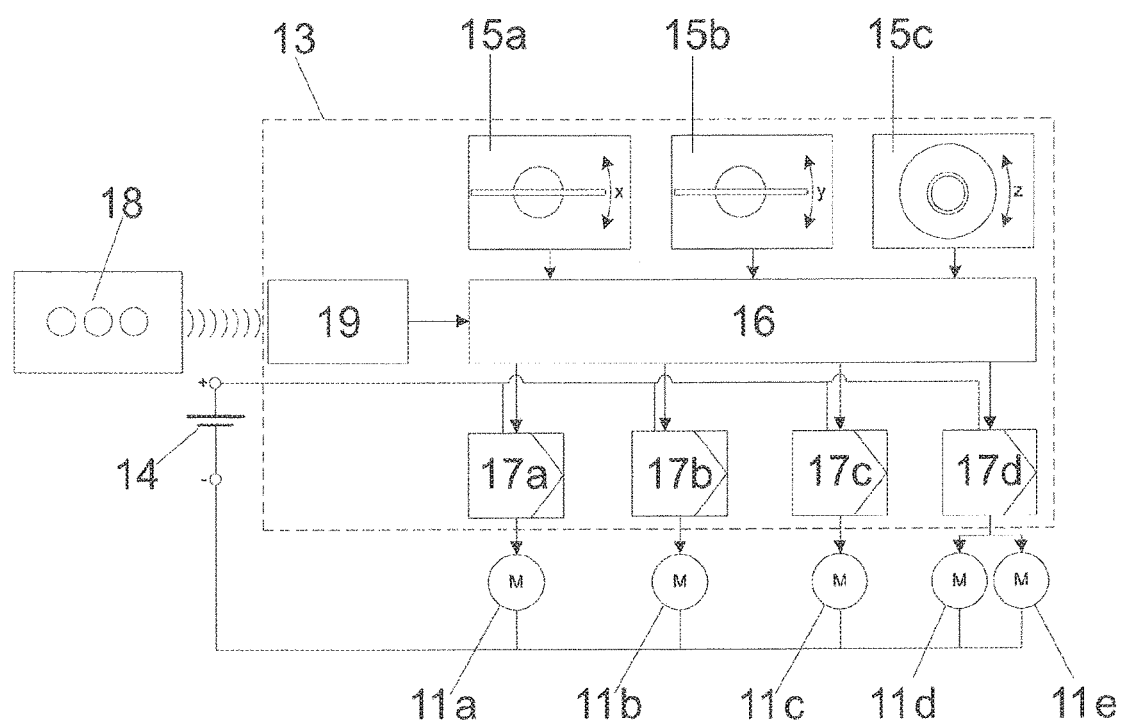
FIG. 8 shows a simplified circuit diagram of the control unit of the vehicle.

FIG. 8 shows a basic circuit diagram of the control unit of the vehicle 1, illustrating the two electric motors 11d and 11e of the fourth and fifth omni-wheels 10b.

Figure 9:
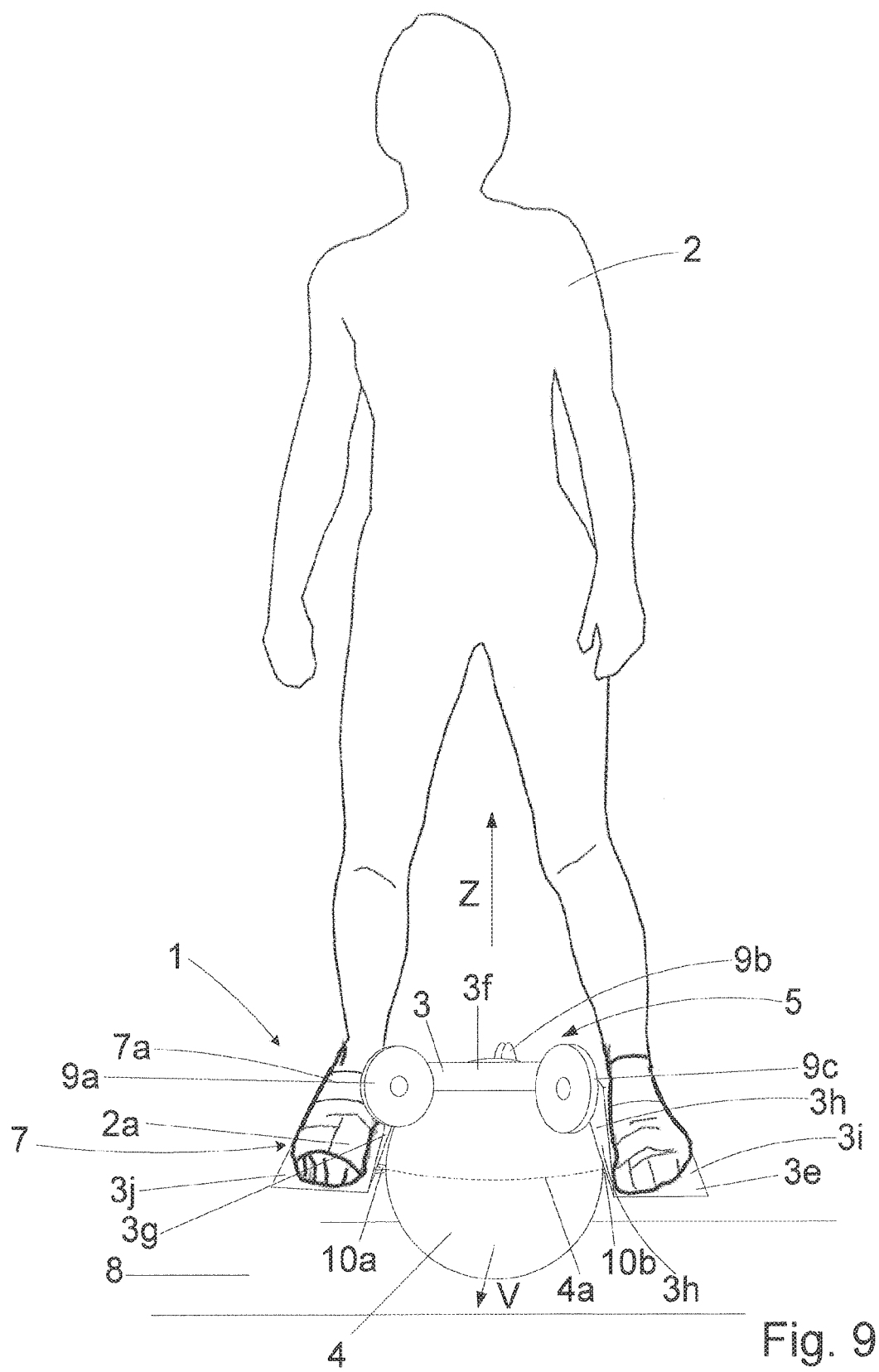
FIG. 9 shows a schematic perspective view of a third embodiment of a vehicle for the movement of a driver in accordance with the invention.

FIG. 9 illustrates a schematic perspective view of a third embodiment of a vehicle 1 for the movement of a driver 2 in accordance with the invention. This embodiment corresponds substantially to the previously described embodiments, so that in relation to the common aspects reference is made to the foregoing description Like reference numerals have also been used to designate like parts. The arrangement of the omni-wheels 9a, 9b, 9c, 10a and 10b corresponds in this case to that of the second embodiment comprising three omni-wheels 9a, 9b, 9c which are arranged at an angular spacing of 120 degrees with respect to one another and which are used as drive wheels and support wheels, and two further omni-wheels 10a, 10b which act upon the equator and control the movement about the vertical axis z. The carrier element 3 which is designed as a ring in the first two embodiments is replaced in the third embodiment by a carrier element 3 which, as seen in the forwards travel direction V, resembles a trapezoidal roof profile as seen in cross-section. The carrier element 3 thus consists, starting from the top, of a horizontal and flat cross member 3f which is adjoined at the edges on the right and left in each case by a downwardly extending side web 3g, 3h. The cross member 3f is thus located above the ball 4 and the two side webs 3g, 3h extend, starting from the cross member 3f, perpendicularly or expanding obliquely outwards down to approximately the height of the equator 4a of the ball 4. The lower ends of the side webs 3g, 3h are adjoined by horizontal and outwardly pointing side legs 3i, 3j which are of a sufficient width and length to accommodate the right and left standing surfaces 7 which are thus located on opposite sides of the ball 4 at the height of the equator 4a. The right and left side legs 3i, 3j can be designed to fold upwards in order to make the vehicle 1 even more compact and easier to transport. In relation to the height of the position of the standing surfaces 7 with respect to the equator 4a, reference is made to the preceding description. The H-shaped form of the carrier element 3 can be seen in the plan view thereof. By virtue of the weight force produced by a driver standing on the two standing surfaces 7, the omni-wheels 10a and 10b arranged underneath the side legs 3i, 3j (see FIG. 10) are pressed against the ball 4, so that they have sufficient traction on the ball 4. The same also applies to the three upper omni-wheels 9a, 9b and 9c which are mounted on the cross member 3f. The advantage of this third embodiment in comparison with the previously described first and second embodiments resides in the fact that the outer dimensions of the vehicle 1 are clearly smaller and the vehicle 1 can therefore be transported more conveniently on local city transport, in particular the underground railway, suburban railway and on escalators. The contact between the driver 2 and the standing surfaces 7 is restricted, as in the case of all of the other embodiments, to the feet and, as the case may be, the calves of the driver 2. Control is then effected, as in all of the embodiments described herein, by shifts of weight in the desired movement direction.

Figure 10:
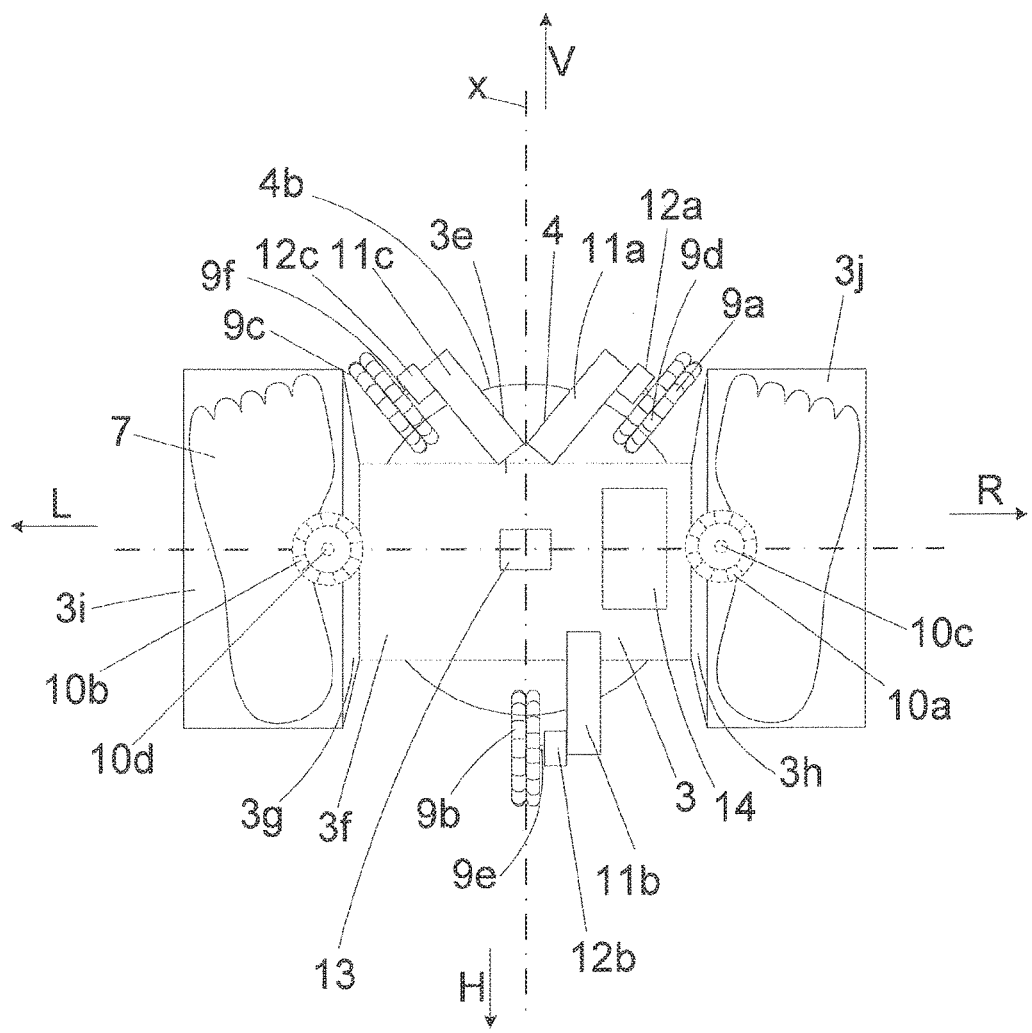
FIG. 10 shows a plan view of the vehicle in accordance with FIG. 9 without a driver.

FIG. 10 is a plan view of the vehicle in accordance with FIG. 9 without a driver and shows in the centre the carrier element 3 which supports 5 the three motors 11a, 11b and 11c for the drive each comprising their transmissions 12a, 12b and 12c and the omni-wheels 9a, 9b and 9c which are driven thereby. In this case, the omni-wheels 9a, 9b and 9c are used both for driving purposes and as a supporting connection between the carrier element 3 and the ball 4. To the side of the ball 4, the standing surfaces 7 are mounted opposite one another approximately at the height of the equator 4a. The connection between the cross member 3f and the side legs 3i, 3j having the standing surfaces 7 via the side webs 3g, 3h is configured such that the side legs 3i, 3j having the standing surfaces 7 can move them elastically in the direction of the ball 4, but are otherwise sufficiently rigid to be able to carry the driver 2 safely. The omni-wheels 10a and 10b are located underneath the side legs 3i, 3j having the standing surfaces 7 and are thus illustrated by broken lines in the sketch. The control unit 13 and the battery 14 are mounted above the carrier element 3.

Figure 11:
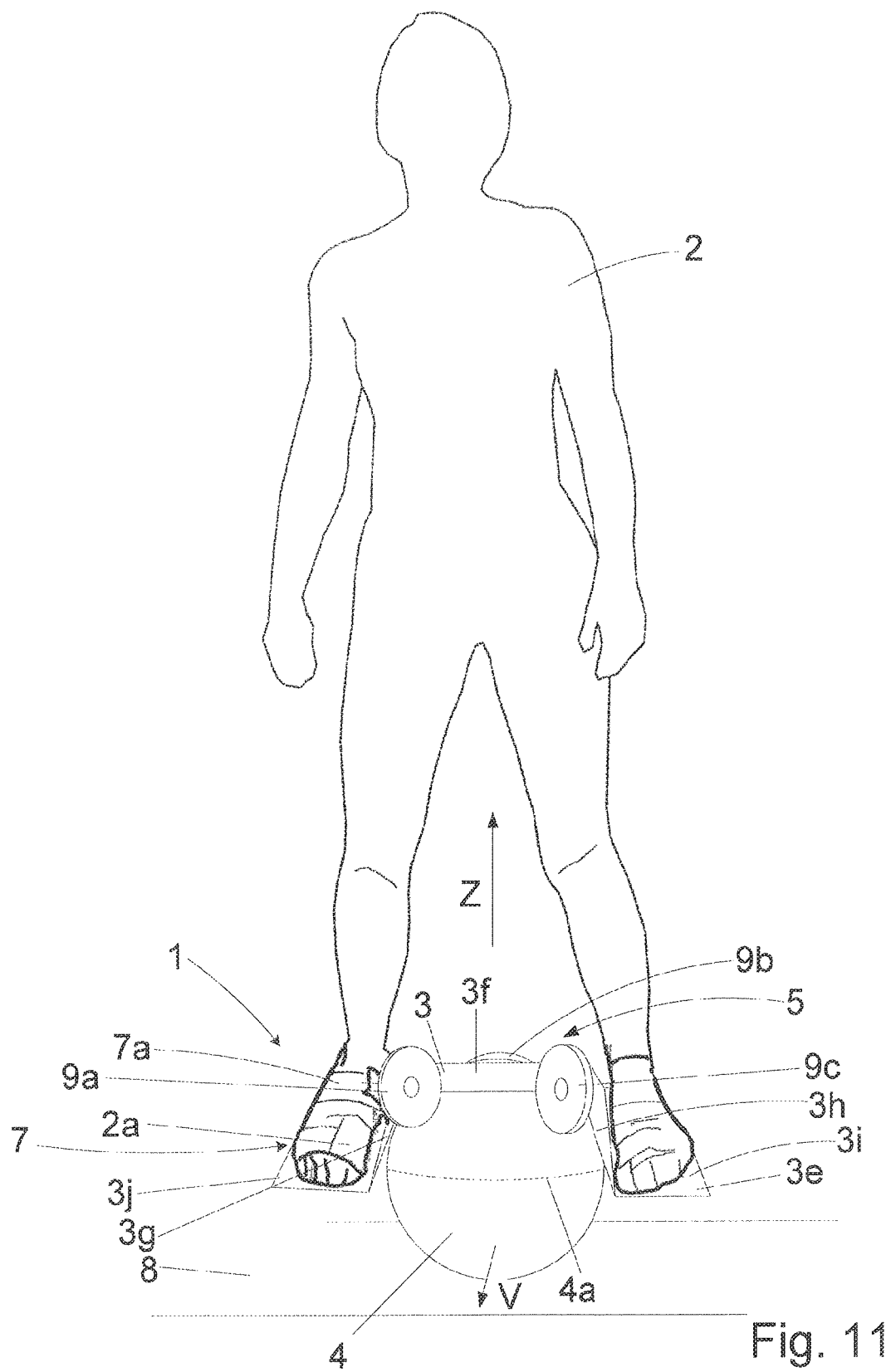
FIG. 11 shows a schematic perspective view of a fourth embodiment of a vehicle for the movement of a driver in accordance with the invention.

FIG. 11 illustrates a schematic perspective view of a fourth embodiment of a vehicle 1 for the movement of a driver 2 in accordance with the invention. This embodiment corresponds substantially to the previously described embodiments, so that in relation to the common aspects reference is made to the foregoing description Like reference numerals have also been used to designate like parts. The arrangement of the omni-wheels 9a, 9b, 9c differs from the previously described embodiments in that the two omni-wheels 9a and 9c which are positioned in line with the chest of the driver 2 and at the front as seen in the forwards travel direction V are arranged with their substantially horizontal axes of rotation 9d, 9f at an angle of 90 degrees with respect to one another as seen in a plan view of the vehicle 1. In contrast to the first and third omni-wheels 9a and 9c, the second omni-wheel 9b is oriented with its axis of rotation 9e bisecting the longitudinal axis x and tilted obliquely forwards from a vertical in the range of 20 to 40 degrees, preferably 30 degrees. Therefore, the second omni-wheel 9b can be used to effect the movement about the vertical axis z. The carrier element 3 is designed in the form of a trapezoidal angle sheet as in the third embodiment. Moreover, by using the second omni-wheel 9b for steering the vehicle 1 about the vertical axis z the fourth and fifth omni-wheels 10a, 10b including the fourth and fifth drive motors 11d, 11f and the associated transmissions are omitted. The three-fold freedom of movement of the ball 4 is actuated in the fourth embodiment with the minimum number of motors 11a, 11b, 11c and omni-wheels 9a, 9b, 9c.

Figure 12:
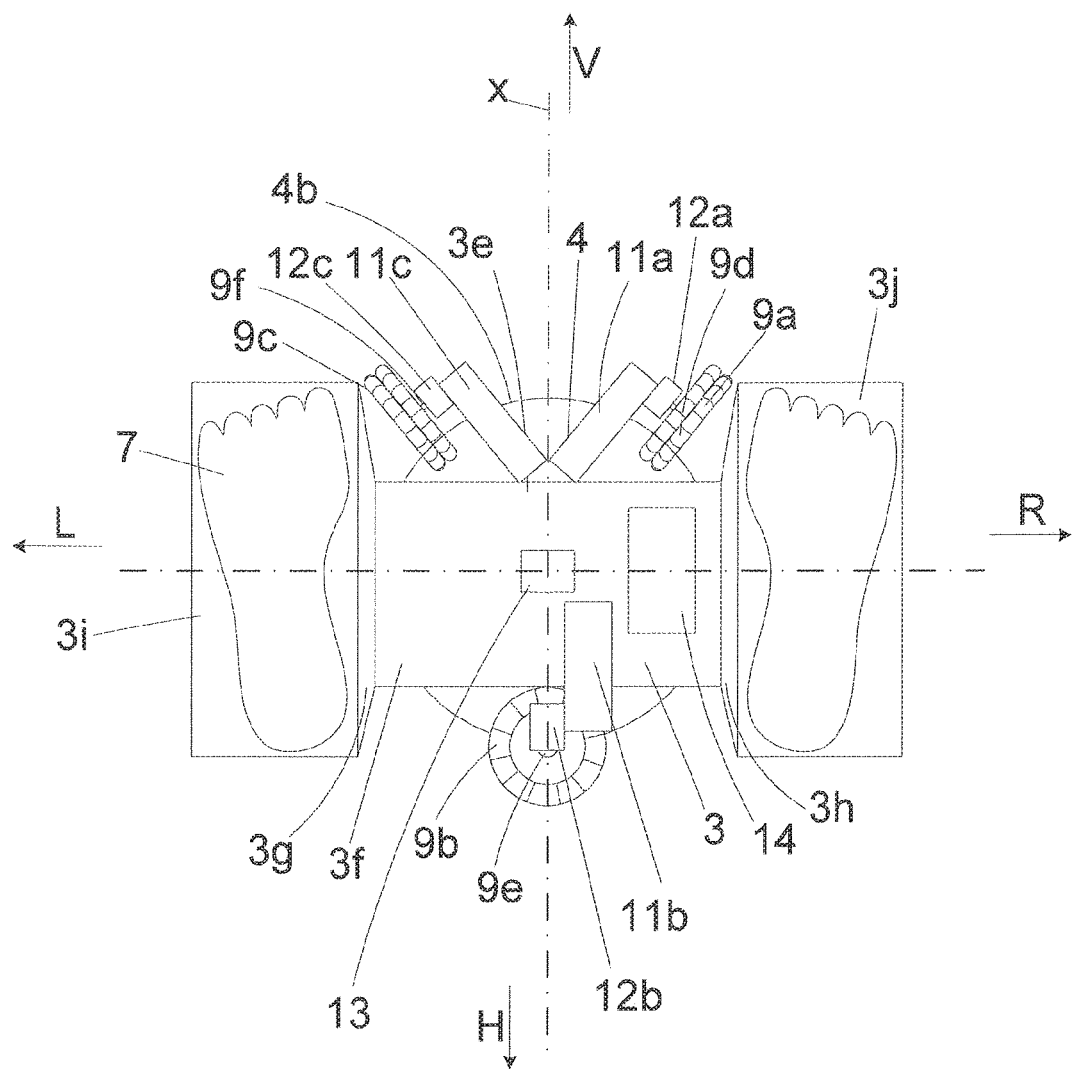
FIG. 12 shows a plan view of the vehicle in accordance with FIG. 11 without a driver.

FIG. 12 shows a plan view of the vehicle in accordance with FIG. 11 without a driver, which corresponds substantially to the third embodiment in accordance with FIG. 9. It is evident that in contrast to the third embodiment the second omni-wheel 9b is oriented with its axis of rotation 9c such that the axis of rotation 9c bisects the longitudinal axis x and is tilted from a vertical obliquely forwards in the range of 10 to 30 degrees. As a result, the second omni-wheel 9b when oriented can also effect the rotation about the vertical axis z.

Figure 13:
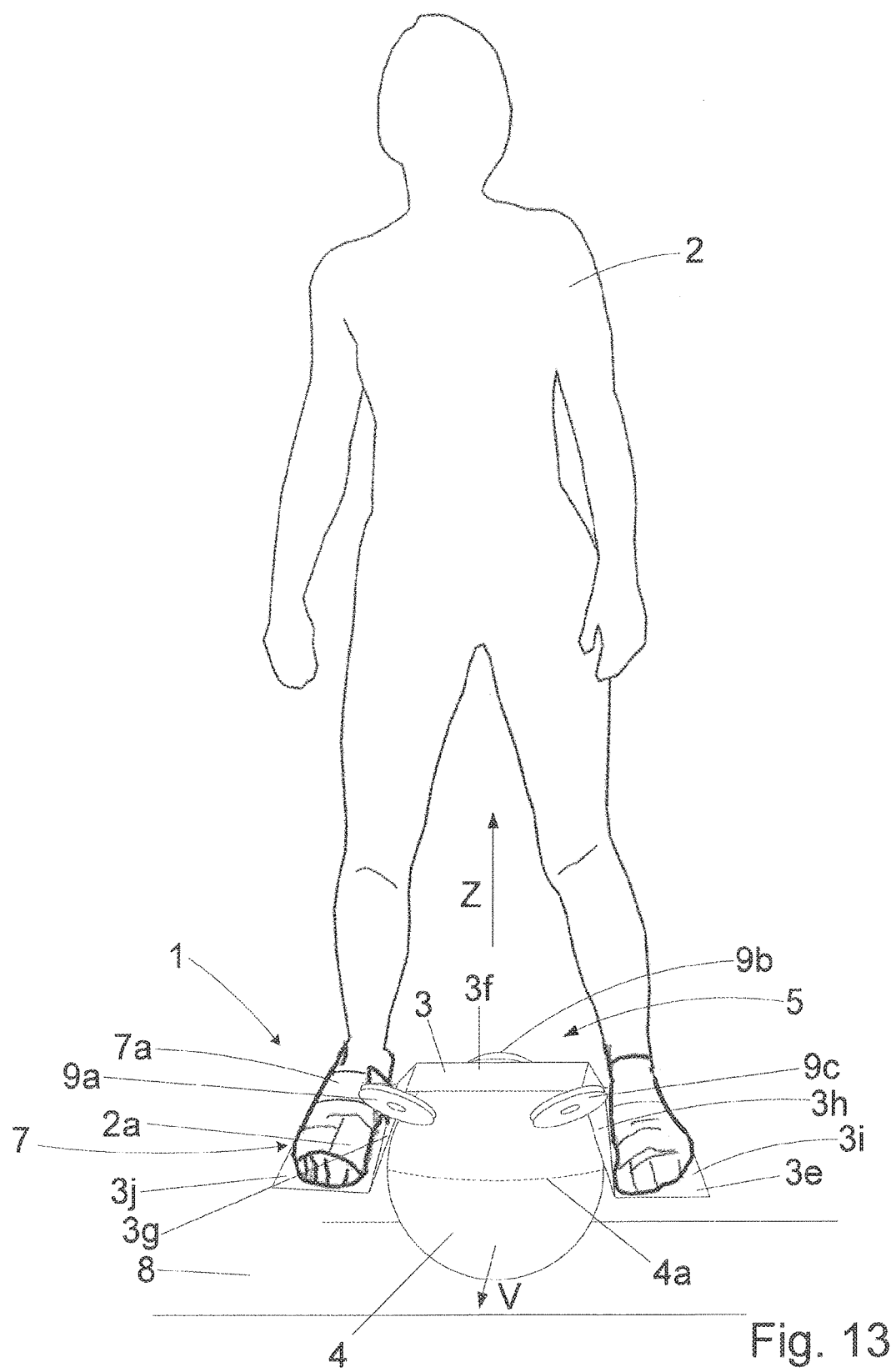
FIG. 13 shows a schematic perspective view of a fifth embodiment of a vehicle for the movement of a driver in accordance with the invention.

FIG. 13 illustrates a schematic perspective view of a fifth embodiment of a vehicle 1 for the movement of a driver 2 in accordance with the invention. This embodiment corresponds substantially to the previously described embodiments, so that in relation to the common aspects reference is made to the foregoing description Like reference numerals have also been used to designate like parts. The arrangement of the first, second and third omni-wheels 9a, 9b and 9c differs from that of the previously described embodiments in that the three omni-wheels 9a, 9b and 9c can each be rotated about an axis of rotation 9d, 9e and 9f which, starting from a vertical, is oriented titled obliquely inwards in the direction of the ball 4 in the range of 20 to 40 degrees, preferably 30 degrees. The axes of rotation 9d, 9e and 9f intersect at a common point above the ball 4 and in the centre of the ball 4 starting from a horizontal ground surface 8 and with the carrier element 8 horizontal. The first, second and third omni-wheels 9a, 9b and 9c are arranged circumferentially with respect to one another over the ball 4 in each case offset by 120 degrees, as seen in plan view of the vehicle 1.

Figure 14:
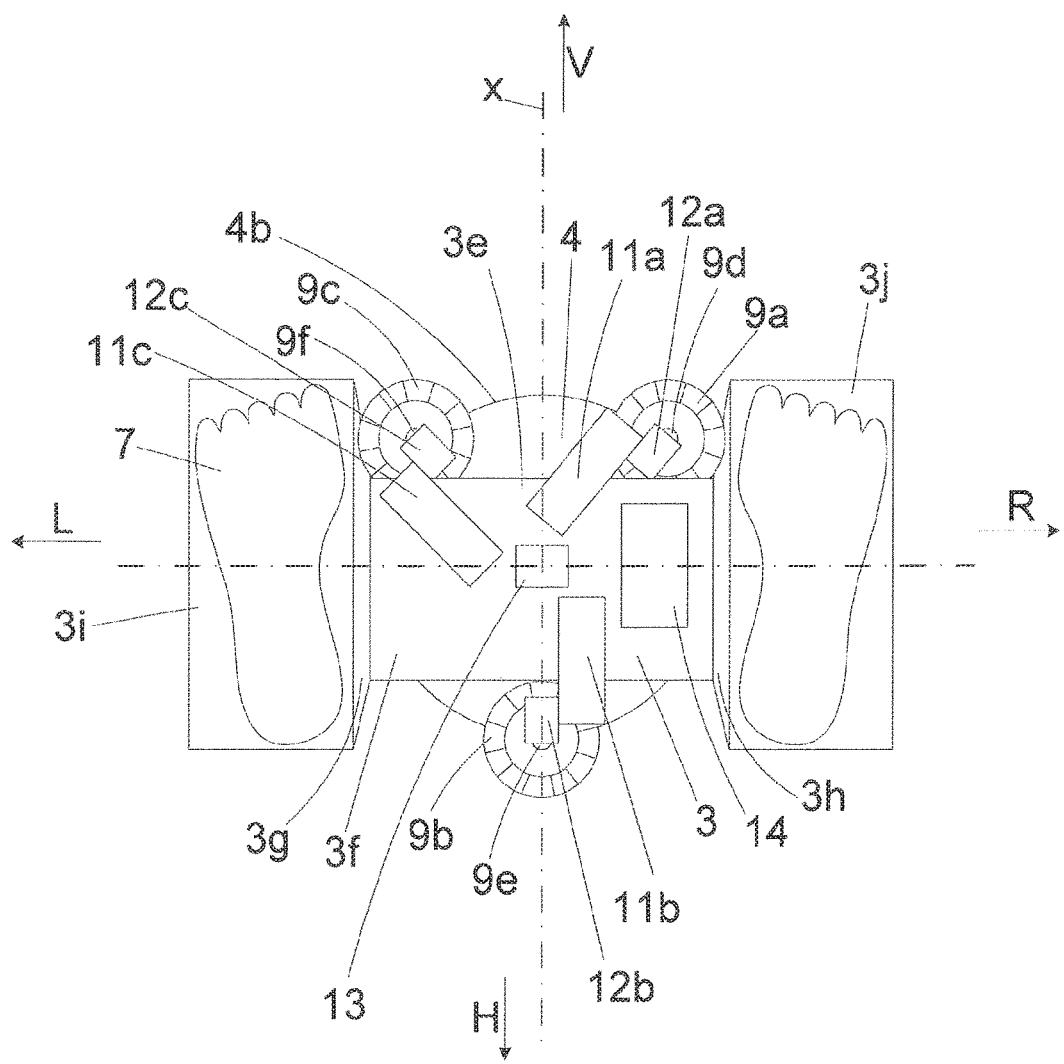
FIG. 14 shows a plan view of the vehicle in accordance with FIG. 13 without a driver.

FIG. 14 shows a plan view of the vehicle in accordance with FIG. 12 without a driver. All of the three omni-wheels 9a, 9b and 9c are arranged uniformly around the ball 4 and drive same. By reason of the previously described orientation of the axes of rotation 9d, 9e and 9f, the three omni-wheels 9a, 9b and 9c can effect on the one hand the travel movements of the ball 4 in all directions and also a rotation of the ball 4 about the vertical axis z, so that in an advantageous manner further omni-wheels performing this function can be dispensed with.

In all of the previously described exemplified embodiments, the omni-wheels 9a, 9b and 9c are supported on the upper half of the ball 4. When the ball 4 is compared with a terrestrial globe, the location of the contact of the omni-wheels 9a, 9b and 9c with the ball 4 can be described as being in the range of 20 to 40, preferably 30, degrees of northerly latitude.

LIST OF REFERENCE NUMERALS 1 vehicle
2 driver
2a feet
3 carrier element
3a disk
3b opening
3c outer edge
3d inner edge
3e upper side
3f cross member
3g first side web
3h second side web
3i first side leg
3j second side leg
4 ball
4a equator
4b surface
5 drive arrangement
6 gap
7 standing surfaces
7a holding strap
8 ground surface
9a first omni-wheel
9b second omni-wheel
9c third omni-wheel
9d first axis of rotation
9e second axis of rotation
9f third axis of rotation
10a fourth omni-wheel
10b fifth omni-wheel
10c fourth axis of rotation
10d fifth axis of rotation
11a first motor
11b second motor
11c third motor
11d fourth motor
11e fifth motor
12a first transmission
12b second transmission
12c third transmission
13 control unit
14 battery
15a pitch gyroscope
15b roll gyroscope
15c yaw gyroscope
16 evaluation control unit
17a first regulator
17b second regulator
17c third regulator
17d fourth regulator
18 switching element
19 receiver
H rearwards travel direction
L left travel direction
R right travel direction
V forwards travel direction
x longitudinal axis
y transverse axis
z vertical axis

The invention claimed is:

1. A vehicle for the movement of a driver, said vehicle comprising a rolling element configured to roll on a ground surface, a carrier element unstably supported on the rolling element, a drive arrangement which is supported by the carrier element and drives the rolling element, and a control unit, by way of which the drive arrangement is steered in a desired travel direction in dependence upon the inclination of the carrier element and the inclination direction of the carrier element wherein the vehicle comprising the carrier element is configured such that during the operation of the vehicle the driver stands freely balancing on the carrier element, and wherein the rolling element is a ball, and wherein the drive arrangement is operable to move the vehicle in any desired travel direction and wherein the vehicle is configured such that the driver is in contact with the vehicle exclusively by way of either the driver's feet or the driver's feet and lower legs, wherein an opening is arranged in the carrier element and the ball protrudes into the opening in the carrier element and wherein the vehicle is configured such that the driver's feet are in a position laterally beside the ball seen in a forward travel direction.

2. The vehicle as claimed in claim 1, wherein the vehicle does not have a holding grip for the driver.

3. The vehicle as claimed in claim 1, wherein the carrier element is designed as an annular disk and the carrier element has a circular, oval or rectangular edge or combinations thereof.

4. The vehicle as claimed in claim 3, wherein the annular disk of the carrier element is arranged in the region of the height of a horizontal equator of the ball.

5. The vehicle as claimed in claim 1, wherein the carrier element is in the shape of a trapezoidal sheet as seen in the forward travel direction of the vehicle.

6. The vehicle as claimed in claim 1, wherein standing surfaces for the driver are arranged on the carrier element and the standing surfaces are arranged oppositely in relation to the ball.

7. The vehicle as claimed in claim 6, wherein the standing surfaces for the driver are arranged in the region of the height of a horizontal equator of the ball.

8. The vehicle as claimed in claim 1, wherein the drive arrangement is attached to the carrier element and the drive arrangement comprises at least two omni-wheels with each said omni wheel having an axis of rotation for transmitting driving forces to the ball.

9. The vehicle as claimed in claim 8, wherein three omni-wheels are arranged on the carrier element and are distributed uniformly around the ball.

10. The vehicle as claimed in claim 8, wherein the axis of rotation of the omni-wheels is oriented in parallel with the carrier element.

11. The vehicle as claimed in claim 8, wherein at least one of the axes of rotation is inclined proceeding from a vertical position in the direction of the ball.

12. The vehicle as claimed in claim 8, wherein each omni-wheel is driven by means of a transmission and an electric motor and each electric motor is attached to the carrier element.

13. The vehicle as claimed in claim 8, wherein gyroscopes are arranged on the carrier element and measure the inclination and inclination direction of the carrier element and transmit the measured inclination and inclination direction to the control unit.

14. The vehicle as claimed in claim 1, wherein the drive arrangement comprises at least one omni-wheel having an axis of rotation, the axis of rotation thereof being in parallel with the vertical axis of the ball when the carrier element is horizontally oriented and the at least one omni-wheel acts upon the ball at the height of a horizontal equator.

15. The vehicle as claimed in claim 14, wherein the drive arrangement comprises a pair of omni-wheels, wherein each of the omni-wheels has an axis of rotation that is parallel with the vertical axis of the ball when the carrier element is horizontally oriented, and wherein the omni-wheels act upon the ball at the height of a horizontal equator and are arranged on the carrier element oppositely in relation to the ball.

16. The vehicle as claimed in claim 15, wherein during a movement of the vehicle in the forwards travel direction the pair of omni-wheels act upon the ball in the region of a roll axis.

17. The vehicle as claimed in claim 15, further including three additional omni-wheels having axes of rotation for transmitting driving forces to the ball, and wherein the three additional omni-wheels are distributed uniformly around the ball.

18. The vehicle as claimed in claim 17, wherein the axes of rotation of the three additional omni-wheels are oriented in parallel with the carrier element.

19. The vehicle as claimed in claim 1, wherein gyroscopes are arranged on the carrier element and measure the inclination and inclination direction of the carrier element and transmit the measured inclination and inclination direction to the control unit.

20. The vehicle as claimed in claim 1, wherein the control unit comprises a balance-control module configured to assist a driver in balancing the carrier element in a horizontal position in space.

* * * * *